United States Patent
Hsieh

(10) Patent No.: US 8,237,793 B2
(45) Date of Patent: Aug. 7, 2012

(54) MONITORING SYSTEM

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/649,351

(22) Filed: Dec. 30, 2009

(65) Prior Publication Data

US 2011/0157356 A1 Jun. 30, 2011

(30) Foreign Application Priority Data

Dec. 25, 2009 (TW) .............................. 98145163 A

(51) Int. Cl.
*H04N 7/18* (2006.01)
(52) U.S. Cl. ...................................... 348/143; 386/226
(58) Field of Classification Search .................. 348/143; 386/226
See application file for complete search history.

(56) References Cited

U.S. PATENT DOCUMENTS

| | | | |
|---|---|---|---|
| 7,190,392 B1* | 3/2007 | Maguire, Jr. .................. | 348/121 |
| 7,860,084 B2* | 12/2010 | Binder .......................... | 370/353 |
| 2004/0150734 A1* | 8/2004 | Sobel et al. .................. | 348/272 |
| 2006/0050642 A1* | 3/2006 | Chini et al. .................. | 370/241 |
| 2006/0098638 A1* | 5/2006 | Binder .......................... | 370/356 |
| 2008/0043089 A1* | 2/2008 | Auerbach et al. ............ | 348/14.1 |
| 2009/0195653 A1* | 8/2009 | Miao ............................. | 348/149 |
| 2009/0274219 A1* | 11/2009 | Greene et al. ............ | 375/240.26 |
| 2009/0276813 A1* | 11/2009 | Bleiweiss et al. ............... | 725/82 |
| 2010/0214484 A1* | 8/2010 | Weaver ........................ | 348/581 |
| 2011/0157356 A1* | 6/2011 | Hsieh ........................... | 348/143 |
| 2011/0157372 A1* | 6/2011 | Liu et al. ....................... | 348/180 |

* cited by examiner

*Primary Examiner* — John Follansbee
*Assistant Examiner* — Anthony Mejia
(74) *Attorney, Agent, or Firm* — Altis Law Group, Inc.

(57) ABSTRACT

A monitoring system applies to a long distance transmission. A number of data acquisition devices records still images and video as signals and converts the video signals into voltage signals suitable for transmission. A monitoring host connected to the number of data acquisition devices via a network cable for long distance transmission processes the voltage signals to show the video.

7 Claims, 2 Drawing Sheets

MONITORING SYSTEM

BACKGROUND

1. Technical Field

The present disclosure relates to a monitoring system.

2. Description of Related Art

Nowadays, a monitoring system including a variety of data acquisition devices, such as network recorders for recording still images, moving images, etc, and a monitoring host connected via a twisted pair has been widely used. Each network recorder of such monitoring system has an internet protocol (IP) address, therefore, the monitoring host can access any one of the network recorders to obtain and show recorded videos of the network recorders via the corresponding IP address. However, signals transmitted in the twisted pair are easy to become weaker as transmission distances become longer, thereby making the monitoring system using the twisted pair suitable only for shorter distances.

DETAILED DESCRIPTION

Figure 1:
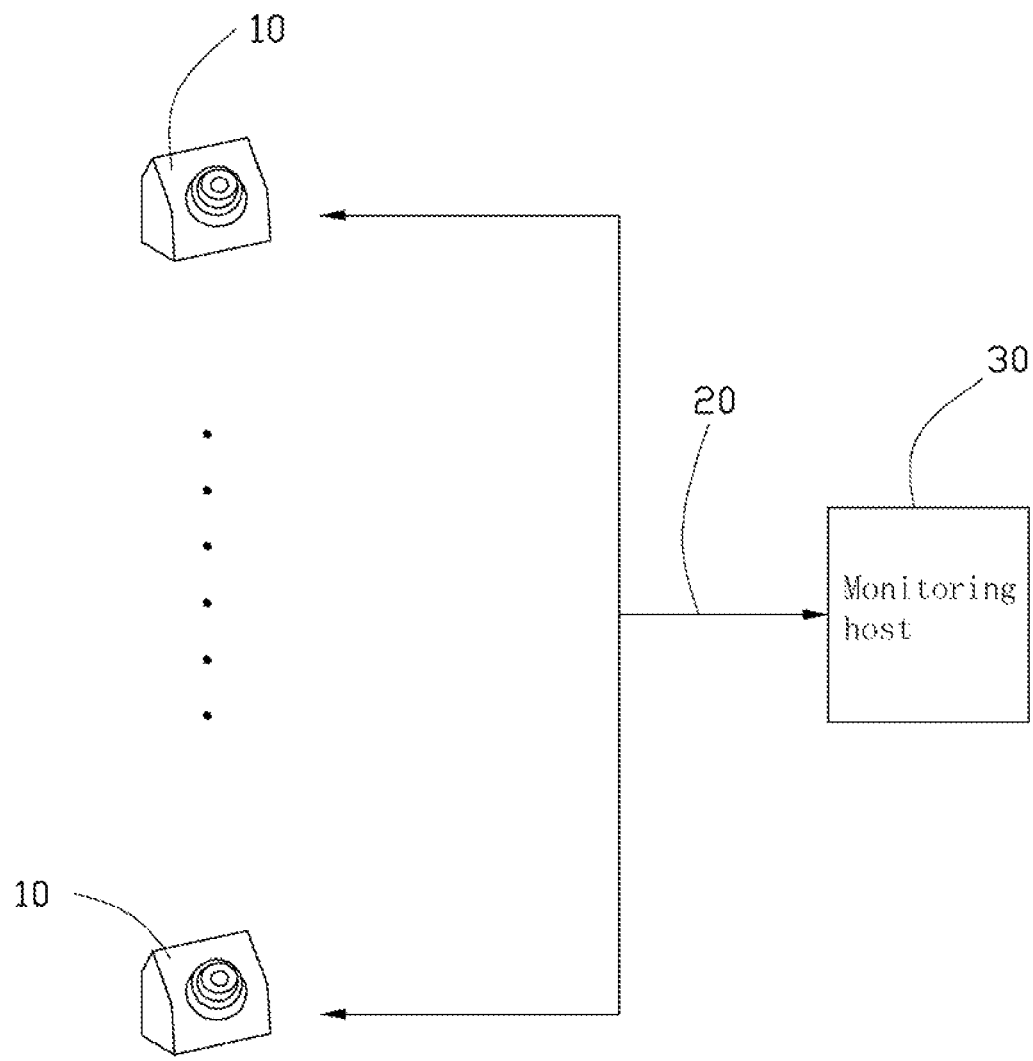
FIG. 1 is a schematic view of an exemplary embodiment of a monitoring system, the monitoring system including a plurality of data acquisition devices and a monitoring host.
Figure 2:
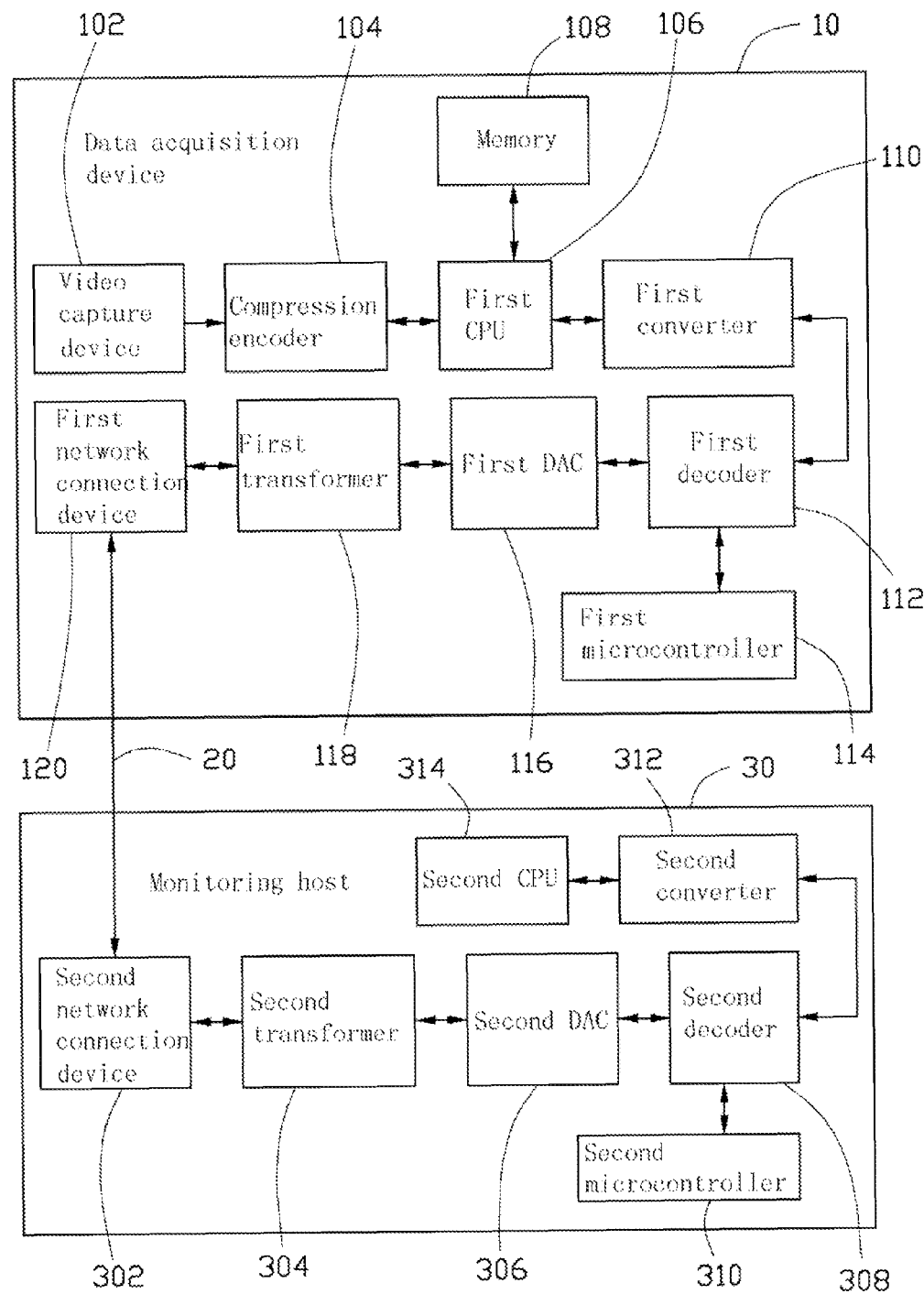
FIG. 2 is a block diagram of one of the plurality of data acquisition devices and the monitoring host of FIG. 1.

Referring to FIGS. 1 and 2, an exemplary embodiment of a monitoring system includes a plurality of data acquisition devices 10 and a monitoring host 30 connected to the plurality of data acquisition devices 10 via a network cable (e.g., coaxial cable 20) for long distance transmission. As signals transmitted in the long coaxial cable 20 are not attenuated, the plurality of data acquisition devices 10 can communicate with the monitoring host 30 far away via the coaxial cable 20. In this embodiment, the plurality of data acquisition devices 10 is comprised of network recorders for recording still images and video.

Each data acquisition device 10 includes a video capture device 102, a compression encoder 104, a first central processing unit (CPU) 106, a memory 108, a first converter 110, a first decoder 112, a first microcontroller 114, a first digital to analog converter (DAC) 116, a first transformer 118, and a first network connection device 120. The video capture device 102, the compression encoder 104, the first CPU 106, the first converter 110, the first decoder 112, the first DAC 116, the first transformer 118, and the first network connection device 120 are sequentially connected in series. The first CPU 106 is also connected to the memory 108. The first decoder 112 is also connected to the first microcontroller 114. The first network connection device 120 is connected to the monitoring host 30 via the coaxial cable 20.

The monitoring host 30 includes a second network connection device 302, a second transformer 304, a second DAC 306, a second decoder 308, a second microcontroller 310, a second converter 312, and a second CPU 314. The second network connection device 302, the second transformer 304, the second DAC 306, the second decoder 308, the second converter 312, and the second CPU 314 are sequentially connected in series. The second decoder 308 is also connected to the second microcontroller 310. The second network connection device 302 is connected to the first network connection device 120 via the coaxial cable 20. In this exemplary embodiment, the first and second network connection devices 120 and 302 are coaxial cable connectors, the video capture device 102 is a device including a complementary metal oxide semiconductor (CMOS) or a charge-coupled device (CCD), the first and second decoders 112 and 308 are very-high-bit-rate digital subscriber loop discrete multitone (VDSL DMT) devices, and the first and second DACs 116 and 306 are analog front end (AFE) components.

In use, the video capture device 102 captures video as signals. The compression encoder 104 compresses the video signals, and sends the compressed video signals to the first CPU 106 to be stored in the first CPU 106, the first CPU 106 can send the compressed video signals to the memory 108. In one embodiment, the compression encoder 104 may use a superior audio compression technique based on moving pictures experts group (MPEG) or motion joint photographic experts group (MJPEG) to compress the video signals. The first converter 110 reads the compressed video signals stored in the memory 108, and converts the compressed video signals into physical layer transmission signals, which are suitably transmitted in a twisted pair. The first decoder 112 controlled by the first microcontroller 114 converts the physical layer transmission signals into low frequency pulse signals. The first DAC 116 converts the low frequency pulse signals into analog signals. The first transformer 118 converts the analog signals into voltage signals suitable for transmission, and sends the voltage signals to the monitoring host 30 via the first network connection device 120 and the coaxial cable 20.

The second transformer 304 of the monitoring host 30 receives the voltage signals output from the data acquisition device 10 and received via the second network connection device 302, and converts the voltage signals into analog signals. The second DAC 306 converts the analog signals into low frequency pulse signals. The second decoder 308 controlled by the second microcontroller 310 converts the low frequency pulse signals into physical layer transmission signals, which are suitably transmitted in the twisted pair. The second converter 312 converts the physical layer transmission signals into video signals, and displays video on a monitor under the control of the second CPU 314.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A monitoring system comprising:
   a plurality of data acquisition devices, each data acquisition device comprising:
      a video capture device to capture video as signals;
      a compression encoder to compress the video signals;
      a first central processing unit (CPU) to receive the compressed video signals from the compression encoder;
      a memory to store the compressed video signals from the first CPU;
      a first converter to read the compressed video signals stored in the memory via the first CPU, and convert the compressed video signals into physical layer transmission signals which are suitably transmitted in a twisted pair;
      a first microcontroller;
      a first decoder controlled by the first microcontroller to convert the physical layer transmission signals into low frequency pulse signals;

a first digital to analog converter (DAC) to convert the low frequency pulse signals into analog signals; and a first transformer to convert the analog signals into voltage signals suitable for transmission, and output the voltage signals via a first network connection device; and a monitoring host connected to the plurality of data acquisition devices via a network cable, to receive and process the voltage signals to display the video.

2. The system of claim 1, wherein the monitoring host comprises a second network connection device, a second transformer, a second DAC, a second decoder, a second microcontroller, a second converter, and a second CPU, the second transformer receives the voltage signals via the second network connection device, and converts the voltage signals into analog signals, the second DAC converts the analog signals into low frequency pulse signals, the second decoder controlled by the second microcontroller converts the low frequency pulse signals into physical layer transmission signals which are suitably transmitted in the twisted pair, the second converter converts the physical layer transmission signals into video signals, and displays the video under the control of the second CPU.

3. The system of claim 1, wherein the plurality of data acquisition devices is a plurality of network recorders.

4. The system of claim 1, wherein the network cable is a coaxial cable.

5. The system of claim 1, wherein the first network connection device is a coaxial cable connector.

6. The system of claim 1, wherein the first decoder is a very-high-bit-rate digital subscriber loop discrete multitone device.

7. The system of claim 1, wherein the first DAC is an analog front end component.

* * * * *